(12) United States Patent
Takagawa et al.

(10) Patent No.: US 12,298,407 B2
(45) Date of Patent: May 13, 2025

(54) OBJECT DETECTION SYSTEM, TRANSPORT VEHICLE, AND OBJECT DETECTION DEVICE

(71) Applicants: HOKUYO AUTOMATIC CO., LTD., Osaka (JP); DAIFUKU CO., LTD., Osaka (JP)

(72) Inventors: Natsuo Takagawa, Gamo-gun (JP); Akihito Yamamoto, Osaka (JP); Takahiro Kasahara, Osaka (JP)

(73) Assignees: HOKUYO AUTOMATIC CO., LTD., Osaka (JP); DAIFUKU CO., LTD., Osaka (JP)

( * ) Notice: Subject to any disclaimer, the term of this patent is extended or adjusted under 35 U.S.C. 154(b) by 622 days.

(21) Appl. No.: 17/440,810

(22) PCT Filed: Jan. 29, 2020

(86) PCT No.: PCT/JP2020/003138
§ 371 (c)(1),
(2) Date: Sep. 20, 2021

(87) PCT Pub. No.: WO2020/195128
PCT Pub. Date: Oct. 1, 2020

(65) Prior Publication Data
US 2022/0187467 A1  Jun. 16, 2022

(30) Foreign Application Priority Data
Mar. 25, 2019  (JP) .................................. 2019-056119

(51) Int. Cl.
| | | |
|---|---|---|
| *G01S 17/931* | (2020.01) | |
| *G01S 7/481* | (2006.01) | |
| *G01S 17/04* | (2020.01) | |
| *G01S 17/10* | (2020.01) | |
| *G05D 1/00* | (2006.01) | |

(52) U.S. Cl.
CPC .......... *G01S 17/931* (2020.01); *G01S 7/4817* (2013.01); *G01S 17/04* (2020.01); *G01S 17/10* (2013.01); *G05D 1/0223* (2013.01)

(58) Field of Classification Search
CPC ...... G01S 17/931; G01S 7/4817; G01S 17/04; G01S 17/10; G01S 17/42; G01S 7/481;
(Continued)

(56) References Cited

U.S. PATENT DOCUMENTS

| | | | | |
|---|---|---|---|---|
| 4,647,209 A | * | 3/1987 | Neukomm | G01S 17/48 |
| | | | | 356/3.05 |
| 2009/0045999 A1 | | 2/2009 | Samukawa et al. | |

(Continued)

FOREIGN PATENT DOCUMENTS

| | | |
|---|---|---|
| JP | 2001-249718 A | 9/2001 |
| JP | 2002-215238 A | 7/2002 |

(Continued)

OTHER PUBLICATIONS

Jul. 13, 2022 Office Action issued in Indian Patent Application No. 202127042498.

(Continued)

*Primary Examiner* — Hwa Andrew Lee
(74) *Attorney, Agent, or Firm* — Oliff PLC

(57) ABSTRACT

An object detection device includes: a scanning optical system configured to scan a space by measurement light and guide reflected light from an object; a distance calculation circuit configured to calculate a distance and a direction to the object based on physical relationship between the measurement light and the reflected light; an object determination circuit configured to determine whether the distance and the direction to the object are within a predetermined monitoring region; a signal output circuit configured to output an object detection signal upon determination that the (Continued)

object is within the monitoring region; and a mode switching circuit configured to switch to either a first mode in which it is determined whether the object is within the monitoring region regardless of an intensity of the reflected light and a second mode in which such determination is performed only when the intensity is at or above a predetermined threshold.

11 Claims, 10 Drawing Sheets

(58) Field of Classification Search
CPC .................. G05D 1/0223; B65G 35/06; B65G 2203/0283
See application file for complete search history.

(56) References Cited

U.S. PATENT DOCUMENTS

| | | |
|---|---|---|
| 2014/0111618 A1 | 4/2014 | Kumagai et al. |
| 2016/0356594 A1 | 12/2016 | Sorenson |
| 2019/0383939 A1 | 12/2019 | Mori et al. |

FOREIGN PATENT DOCUMENTS

| | | |
|---|---|---|
| JP | 2011-069671 A | 4/2011 |
| WO | 2018/150998 A1 | 8/2018 |

OTHER PUBLICATIONS

Dec. 5, 2022 extended Search Report issued in European Patent Application No. 20778989.2.
Aug. 31, 2023 Office Action issued in Chinese Patent Application No. 202080021577.4.
Aug. 25, 2023 Office Action issued in Taiwanese Patent Application No. 109103389.
Mar. 17, 2020 International Search Report issued in International Patent Application No. PCT/JP2020/003138.
Sep. 28, 2021 International Preliminary Report on Patentability issued in International Patent Application No. PCT/JP2020/003138.

\* cited by examiner

OBJECT DETECTION SYSTEM, TRANSPORT VEHICLE, AND OBJECT DETECTION DEVICE

TECHNICAL FIELD

The present invention relates to an object detection system, a transport vehicle, and an object detection device.

BACKGROUND ART

For efficient pickup and delivery of packages and components, a logistics management system built in automated warehouses and other facilities includes a plurality of pickup stations and a plurality of delivery stations arranged inside the warehouse and a route for travel of transport vehicles between the stations. A plurality of transport vehicles travel on the same route to receive packages from, or deliver packages to, the stations. Such a transport vehicle is referred to as a sorting transfer vehicle (STV, which is a Japanese registered trademark No. 2266491).

The route connecting the stations may be composed not only of straight sections but also of curved sections. Each transport vehicle traveling along such a route is provided at its front end with an object detection device so that the transport vehicle does not collide with foreign objects near the route or another transport vehicle ahead.

Patent Literature 1 discloses an obstacle detection sensor for automatic guided vehicles that is capable of changing object detection regions according to a traveling location. The obstacle detection sensor is mounted on the automatic guided vehicle. The obstacle detection sensor includes: a non-contact distance measuring instrument configured to measure a distance to a detected object for each of predetermined angular ranges corresponding to radially dividing a peripheral area around the instrument; a detection area registration unit configured to register a plurality of detection area patterns that is defined by lines connecting a plurality of boundary points specified in the measurement range of the distance measuring instrument; a use pattern setting unit configured to select and set a pattern to be used for each traveling section of the automatic guided vehicle, from among the plurality of detection area patterns registered by the detection area registration unit; and a determination unit configured to output information indicating that an obstacle has been detected during traveling of the automatic guided vehicle, when a distance to a detected object measured by the distance measuring instrument for each predetermined angular range is within a detection area set for the current traveling section.

Patent Literature 2 discloses an example object detection device mounted on an overhead hoist transfer (OHT) vehicle. To avoid erroneous detection caused by reflected light from walls of various manufacturing facilities located near the route laid on the ceiling, as well as collision with an OHT vehicle ahead, the object detection device such as a scanning rangefinder is installed at a front end of an OHT vehicle behind, and a retroreflective member is provided at a rear end of the OHT vehicle ahead.

CITATION LIST

Patent Literature

Patent Literature 1: Japanese Unexamined Patent Application Publication No. 2002-215238
Patent Literature 2: International Publication No. 2018/150998

SUMMARY OF INVENTION

Technical Problem

The obstacle detection sensor disclosed in Patent Literature 1 can change the object detection regions along the traveling route of automatic guided vehicles, so that the obstacle detection sensor has flexibility in detecting objects according to the traveling route.

The object detection device disclosed in Patent Literature 2 is solely intended to avoid collision between OHT vehicles because there are no foreign objects that pose a risk of collision with the OHT vehicles near the route laid on the ceiling. As such, it is sufficient if any erroneous detection caused by reflected light from walls of various manufacturing facilities located near the route can be avoided.

However, in the case of transport vehicles, which travel along a route laid on the floor of the logistics warehouse, a need has existed for detecting people or objects approaching near the route to prevent collisions. A need has also existed for preventing safety fences or facilities installed near curved sections of the route from being erroneously detected as foreign objects.

Hence, the configuration as disclosed in Patent Literature 1 may be adopted to change the object detection regions along the traveling route to improve safety while avoiding any erroneous detection. Specifically, the monitoring region to be monitored by the object detection device may be divided into a plurality of sections along the traveling route of the transport vehicles such that the monitoring regions are expanded for regions that people may possibly enter and the monitoring regions are narrowed for regions in which safety fences or facilities are installed.

However, finely setting and switching the monitoring regions along the traveling route of the transport vehicles requires extremely complicated control, and also poses a risk of collision because setting narrow monitoring regions would narrow a detection range for detecting any transport vehicle ahead.

In view of the above problems, an object of the present invention is to provide an object detection system, a transport vehicle, and an object detection device that are capable of appropriately detecting foreign objects while avoiding erroneous detection of safety fences or facilities as well as avoiding narrowing of the detection range.

Solution to Problem

As a first feature of an object detection system in accordance with the present invention, the object detection system includes: a transport vehicle including a traveling mechanism configured to travel along a predetermined route; and an object detection device mounted on the transport vehicle. The object detection device includes: a light emitting element; a light receiving element; a scanning optical system configured to scan a space by measurement light emitted from the light emitting element and guide reflected light from an object for the measurement light to the light receiving element; a distance calculation circuit configured to calculate a distance and a direction to the object based on physical relationship between the measurement light emitted from the light emitting element and the reflected light detected by the light receiving element; a region memory circuit configured to store a monitoring region; an object determination circuit configured to determine whether the distance and the direction to the object calculated by the distance calculation circuit are within the monitoring region stored in the region memory circuit; a signal output circuit configured to output an object detection signal when the object determination circuit determines that the object is within the monitoring region; and a mode switching circuit configured to switch to either a first mode or a second mode, the first mode being a mode in which the distance calculation circuit, the object determination circuit, and the signal output circuit operate regardless of an intensity of the reflected light received by the light receiving element, the second mode being a mode in which the distance calculation circuit, the object determination circuit, and the signal output circuit operate when the intensity of the reflected light received by the light receiving element is at or above a predetermined threshold and any of the distance calculation circuit, the object determination circuit, and the signal output circuit is inhibited from operating when the intensity of the reflected light received by the light receiving element is below the predetermined threshold. The transport vehicle includes: a traveling control circuit configured to control the traveling mechanism to control traveling of the transport vehicle to a predesignated station and to slow down or stop the transport vehicle based on the object detection signal output from the signal output circuit; and a mode switching signal output circuit configured to output, to the mode switching circuit, a mode switching signal to switch to either the first mode or the second mode.

Once the mode switching circuit switches to the first mode, the distance calculation circuit, the object determination circuit, and the signal output circuit operate regardless of an intensity of the reflected light, and the signal output circuit outputs an object detection signal upon detection of an object within the monitoring region. This feature ensures that, for example, any person or object approaching near the route is detected as an obstacle.

Once the mode switching circuit switches to the second mode, the distance calculation circuit, the object determination circuit, and the signal output circuit operate only when the intensity of the reflected light received by the light receiving element is at or above a predetermined threshold and any of the distance calculation circuit, the object determination circuit, and the signal output circuit is inhibited from operating when the intensity of the reflected light received by the light receiving element is below the predetermined threshold. Thus, even with the presence of an object within the monitoring region, the signal output circuit outputs an object detection signal only when the intensity of the reflected light received by the light receiving element is at or above the predetermined threshold, and the signal output circuit does not output an object detection signal when the intensity of the reflected light received by the light receiving element is below the predetermined threshold. Hence, reflected light from any object (e.g., safety fences) whose intensity as received by the light receiving element is below the predetermined threshold can be removed as noise.

Switching to either the first mode or the second mode is set based on a mode switching signal output from the mode switching signal output circuit of the transport vehicle. Thus, for example, the second mode is selected for a traveling location nearby a safety fence installed along the route, and the first mode is selected for a traveling location at which there is no safety fence around it and there is a risk of a person approaching it. As such, this feature enables easy selection of an appropriate mode based on a traveling location.

In addition to the first feature above, the object detection system in accordance with the present invention has a second feature that the mode switching signal output circuit is configured to output a mode switching signal to switch to the second mode when location information about a transport vehicle ahead is unavailable.

Appropriate mode switching is generally possible because location information about another transport vehicle traveling ahead of a particular transport vehicle can be identified by the system and a cart distance between these transport vehicles can be adjusted in advance to control their traveling. When such appropriate mode switching is impossible due to the system failing to identify the location information about the transport vehicle ahead, the mode switching signal output circuit outputs, to the object detection device, a mode switching signal to switch to the second mode. This feature can prevent unexpected collisions even when, for example, the transport vehicle is traveling within a monitoring region in which objects cannot be detected in the first mode.

In addition to the first or second feature above, the object detection system in accordance with the present invention has a third feature that the transport vehicle further includes a traveling location monitoring circuit configured to monitor a traveling location along the route, and the mode switching signal output circuit is configured to output, to the mode switching circuit, a mode switching signal to switch to either the first mode or the second mode based on the traveling location monitored by the traveling location monitoring circuit.

According to the traveling location monitored by the traveling location monitoring circuit provided in the transport vehicle, the mode switching signal output circuit outputs, to the mode switching circuit of the object detection device, a mode switching signal to switch to either the first mode or the second mode. This feature enables appropriate detection of any object according to the traveling location, i.e., traveling environment.

In addition to any of the first to third features above, the object detection system in accordance with the present invention has a fourth feature that the object detection device further includes a region selection circuit configured to select a monitoring region used for determination by the object determination circuit, from among a plurality of monitoring regions stored in the region memory circuit, and the transport vehicle further includes a monitoring region selection signal output circuit configured to output, to the region selection circuit, a region selection signal to select a monitoring region used for determination by the object determination circuit, based on the traveling location monitored by the traveling location monitoring circuit.

This feature enables appropriate switching of monitoring regions used for determination by the object determination circuit provided in the object detection device, based on the traveling location monitored by the traveling location monitoring circuit provided in the transport vehicle.

In addition to the fourth feature above, the object detection system in accordance with the present invention has a fifth feature that the mode switching circuit is configured to be switchable to either the first mode or the second mode for each monitoring region selected by the region selection circuit.

This feature provides the object detection system with high flexibility for individual monitoring regions as the mode switching circuit can switch to either the first mode or the second mode for each monitoring region.

In addition to the fourth feature above, the object detection system in accordance with the present invention has a sixth feature that the mode switching signal output circuit is configured to output, to the mode switching circuit, a mode switching signal to switch to either the first mode or the second mode for each monitoring region corresponding to a region selection signal output from the monitoring region selection signal output circuit.

This feature enables a fine setting as the selection of the first mode or the second can be set in advance for each monitoring region.

In addition to any of the first to sixth features above, the object detection system in accordance with the present invention has a seventh feature that a particular highly reflective sheet from which reflected light received by the light receiving element has an intensity at or above the predetermined threshold is disposed at a rear end of the transport vehicle, and in the second mode, only a signal corresponding to light reflected from the highly reflective sheet of a transport vehicle ahead and received by the light receiving element is output to the distance calculation circuit.

Upon switching to the second mode, only reflected light from the highly reflective sheet provided to the transport vehicle is detected as an obstacle, and reflected light from any other object is removed as noise.

As a feature of a transport vehicle in accordance with the present invention, the transport vehicle is used in the object detection system having any of the first to seventh features above.

This feature enables the traveling control circuit to appropriately control traveling of the transport vehicle based on the object detection signal output from the object detection device.

As a first feature of an object detection device in accordance with the present invention, the object detection device for detecting an object based on reflected light for measurement light emitted to scan a space includes: a light emitting element; a light receiving element; a scanning optical system configured to scan a space by measurement light emitted from the light emitting element and guide reflected light from an object for the measurement light to the light receiving element; a distance calculation circuit configured to calculate a distance and a direction to the object based on physical relationship between the measurement light emitted from the light emitting element and the reflected light detected by the light receiving element; a region memory circuit configured to store a monitoring region; an object determination circuit configured to determine whether the distance and the direction to the object calculated by the distance calculation circuit are within the monitoring region stored in the region memory circuit; a signal output circuit configured to output an object detection signal when the object determination circuit determines that the object is within the monitoring region; and a mode switching circuit configured to switch to either a first mode or a second mode, the first mode being a mode in which the distance calculation circuit, the object determination circuit, and the signal output circuit operate regardless of an intensity of the reflected light received by the light receiving element, the second mode being a mode in which the distance calculation circuit, the object determination circuit, and the signal output circuit operate when the intensity of the reflected light received by the light receiving element is at or above a predetermined threshold and any of the distance calculation circuit, the object determination circuit, and the signal output circuit is inhibited from operating when the intensity of the reflected light received by the light receiving element is below the predetermined threshold.

In addition to the first feature above, the object detection device in accordance with the present invention has a second feature that the region memory circuit stores a plurality of monitoring regions, the object detection device further includes a region selection circuit configured to select a monitoring region used for determination by the object determination circuit, from among the plurality of monitoring regions stored in the region memory circuit, and the mode switching circuit is configured to be switchable to either the first mode or the second mode for each monitoring region selected by the region selection circuit.

In addition to the second feature above, the object detection device in accordance with the present invention has a third feature that either the first mode or the second mode is set for each of the plurality of monitoring regions stored in the region memory circuit, and the mode switching circuit is configured to switch to either the first mode or the second mode set for a monitoring region selected by the region selection circuit.

In addition to any of the first to third features above, the object detection device in accordance with the present invention has a fourth feature that the plurality of monitoring regions stored in the region memory circuit are able to be input from an external controller in advance.

Advantageous Effects of Invention

As described above, the present invention provides an object detection system, a transport vehicle, and an object detection device that are capable of appropriately detecting foreign objects while avoiding erroneous detection of safety fences or facilities as well as avoiding narrowing of the detection range.

MODE FOR CARRYING OUT THE INVENTION

Hereinafter, an exemplary embodiment will be described wherein the object detection system, the transport vehicle, and the object detection device in accordance with the present invention are used in a logistics management facility.

Figure 1A:
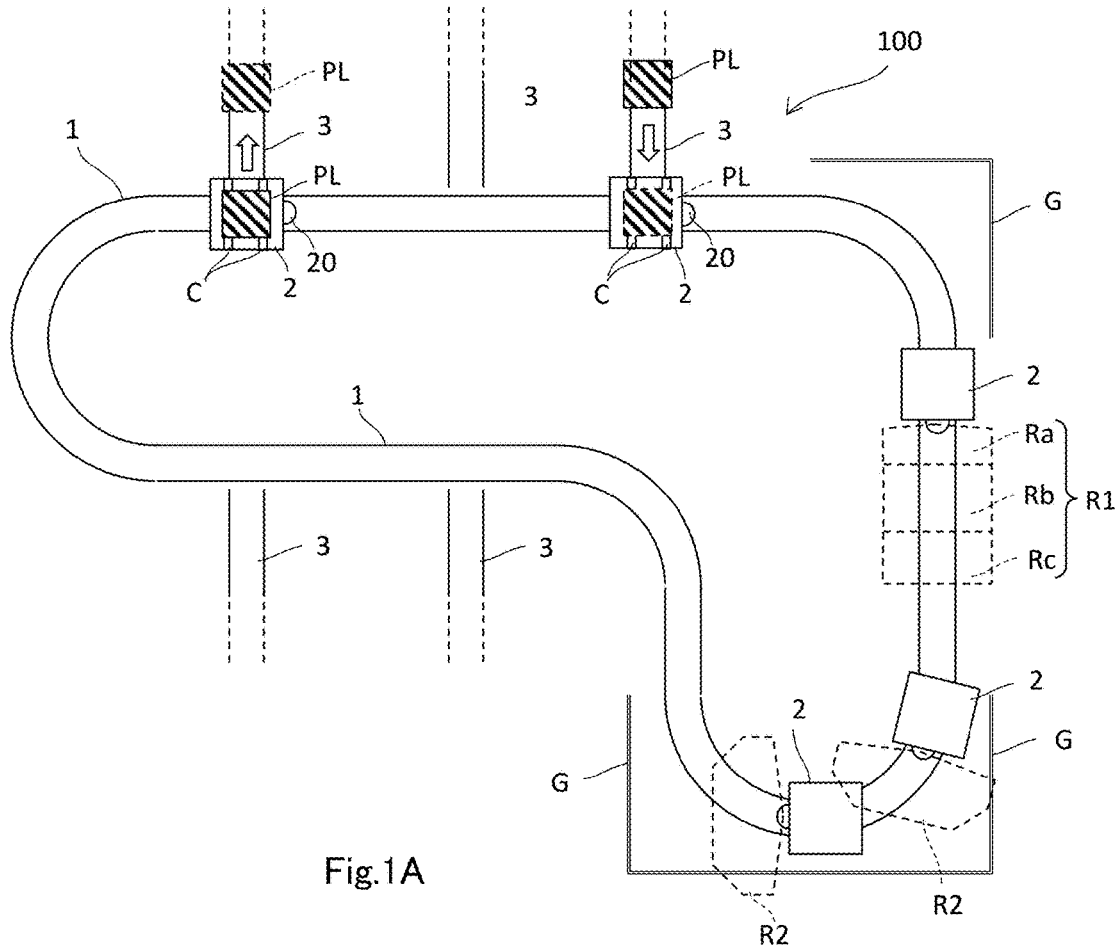
FIG. 1A is a plan view of a logistics management system.
Figures 1B, 1C:
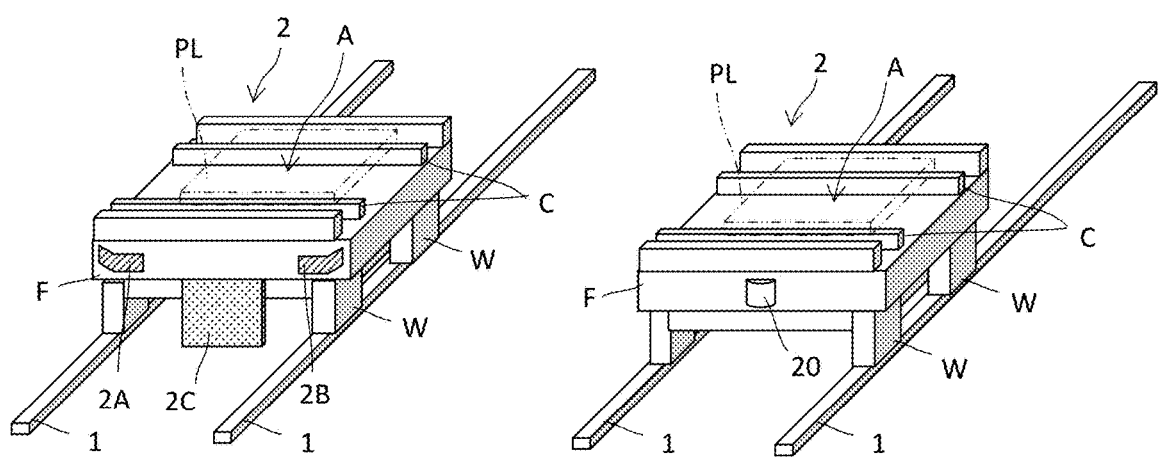
FIG. 1B is a rear view of a transport vehicle.
FIG. 1C is a front view of the transport vehicle.

As shown in FIGS. 1A-1C, a logistics management facility 100 includes a route 1 composed of two rails laid on a floor of a building, a plurality of transport vehicles 2 traveling on the route 1, and a plurality of stations 3 disposed along the route 1. Safety fences G are installed around predetermined curved regions of the route 1 to prevent a person from inadvertently approaching the route 1 and accidentally hitting the transport vehicle 2 and to prevent packages from scattering in the event of the packages collapsing under the centrifugal force while the transport vehicle 2 is traveling on a curve.

The transport vehicle 2 includes, among others, a frame F mounted with pairs of front and rear wheels W that travel on the route 1, a pallet rest A provided on the frame F, and a pair of chain conveyor mechanisms C to move a pallet PL placed on the pallet rest A to or from the station 3.

A package placed on the pallet PL, along with the pallet PL, is received and delivered between the transport vehicle 2 and the station 3 via the conveyor mechanisms C. The transport vehicle of this type is referred to as a sorting transfer vehicle (STV, which is a Japanese registered trademark No. 2266491). It should be noted that FIGS. 1B and 1C are schematic in nature and include some simplifications of actual transport vehicles, including actual wheel shapes of the wheels W.

Located inside the frame F are a conveyance controller 40 (see FIG. 2), a traveling motor, and a conveyor motor, among others. The conveyance controller 40 communicates with a host controller HC (see FIG. 2) having overall control over the logistics management facility 100 to cause the transport vehicle 2 to travel to a predetermined station 3 for transfer of the package contained in the pallet PL between the transport vehicle 2 and the station 3. The traveling motor drives the wheels W. The conveyor motor rotates the conveyor mechanisms C in forward and reverse directions.

A front end of the frame F in the traveling direction is mounted with an object detection device 20 at the center in the width direction in plan view (see FIG. 1C). A rear end of the frame F in the traveling direction is provided with retroreflective sheets 2A, 2B, which are highly reflective sheets, at respective ends in the width direction in plan view, and also provided with a reflector 2C hung down from the center in the width direction in plan view (see FIG. 1B). The reflector 2C diffusely reflects light. The highly reflective sheets 2A, 2B are used for detection during traveling on curves and straight lines, and the reflector 2C is used when the transport vehicles are at or more than a predetermined distance away from each other, such as when they are traveling on straight lines.

To ensure detection of the transport vehicle 2 on a left curve, a center region of the highly reflective sheet 2A in the width direction is oriented in a vertical position perpendicularly to an extending direction of the route 1, and a side region of the highly reflective sheet 2A is angled at 45 degrees in the extending direction of the route 1 relative to the center region in the width direction. To ensure detection of the transport vehicle 2 on a right curve, a center region of the highly reflective sheet 2B in the width direction is oriented in a vertical position perpendicularly to the extending direction of the route 1, and a side region of the highly reflective sheet 2B is angled at 45 degrees in the extending direction of the route 1 relative to the center region in the width direction.

Figure 2:
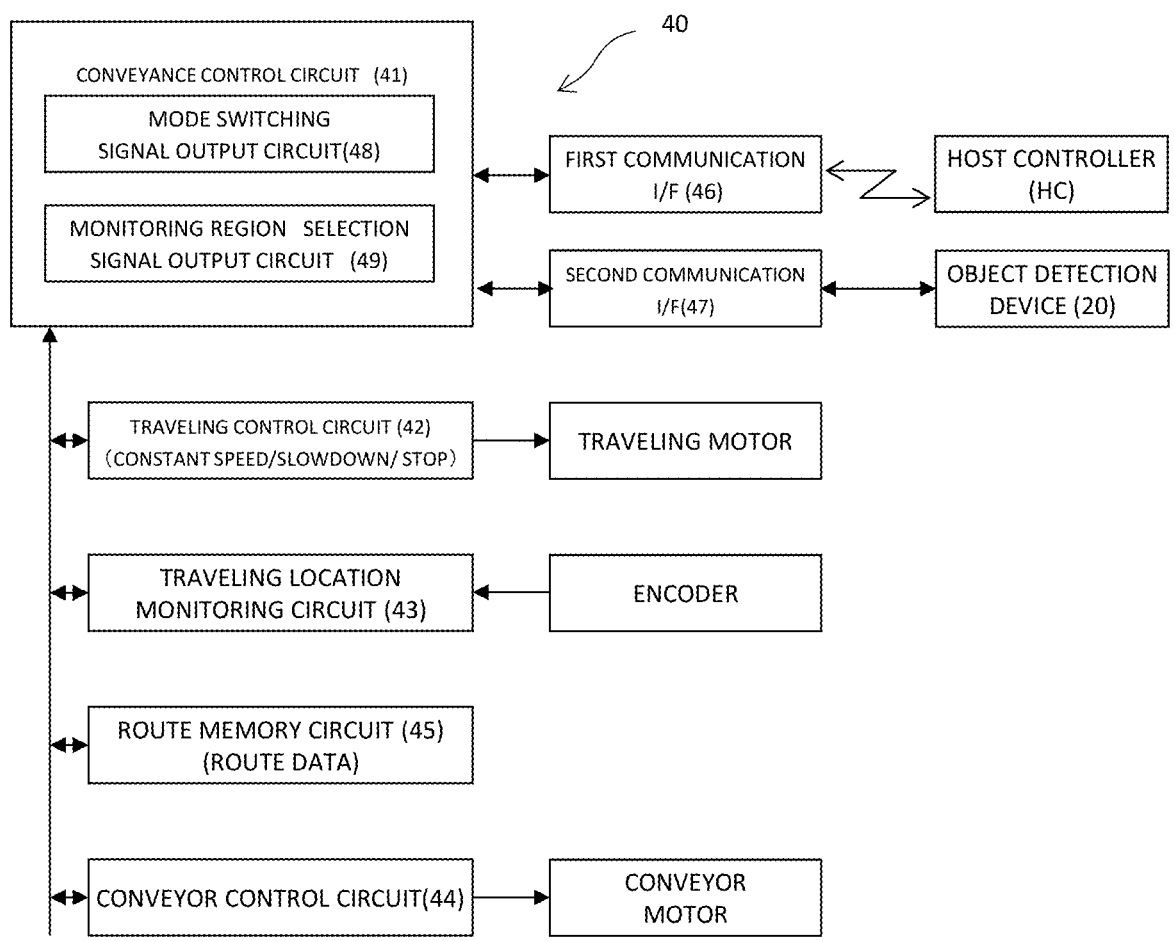
FIG. 2 is a functional block diagram of a control system of the transport vehicle.

FIG. 2 illustrates a plurality of functional blocks constituting a conveyance controller 40 provided in the transport vehicle 2. The conveyance controller 40 is composed of a microcomputer including a plurality of integrated circuits such as a CPU, a memory IC, a communication circuit, and an input/output circuit, and peripheral circuits. Each functional block is implemented as a circuit block as the CPU executes control programs stored in the memory IC.

The conveyance controller 40 includes a conveyance control circuit 41 having overall control over the transport vehicle 2, a traveling control circuit 42 to control the traveling motor based on commands from the conveyance control circuit 41, a traveling location monitoring circuit 43 to monitor a traveling location on the route based on pulse signals from encoders embedded in the wheels W, and a conveyor control circuit 44 to control the conveyor motor.

The traveling location monitoring circuit 43 monitors and identifies a traveling location based on route data stored in a route memory circuit 45 and pulse signals from the encoders. It should be noted that the initial position can be identified based on location data received from the host controller HC or outputs from position sensors provided on the route 1.

The conveyance controller 40 further includes a monitoring region selection signal output circuit 49 and a mode switching signal output circuit 48. The monitoring region selection signal output circuit 49 outputs a monitoring region selection signal for selection of a monitoring region to be monitored by the object detection device 20 according to the traveling location monitored by the traveling location monitoring circuit 43. The mode switching signal output circuit 48 outputs a mode switching signal for switching of object detection modes assumed by the object detection device 20. The mode switching signal output circuit 48 and the monitoring region selection signal output circuit 49 are configured within a logic circuit block constituting the conveyance control circuit 41.

The conveyance control circuit 41 is connected to a first communication interface 46 for wireless communication with the host controller HC and a second communication interface 47 for communication with the object detection device 20. The communication interfaces are not limited to particular standards and may employ general-purpose standards.

The host controller HC wirelessly communicates with individual transport vehicles 2 traveling on the route 1 to identify the traveling location of each transport vehicle 2. The host controller HC designates a destination station for each transport vehicle 2 and issues a package transfer instruction to each transport vehicle 2 to perform transfer of a package between each transport vehicle 2 and the station 3.

Figure 3:
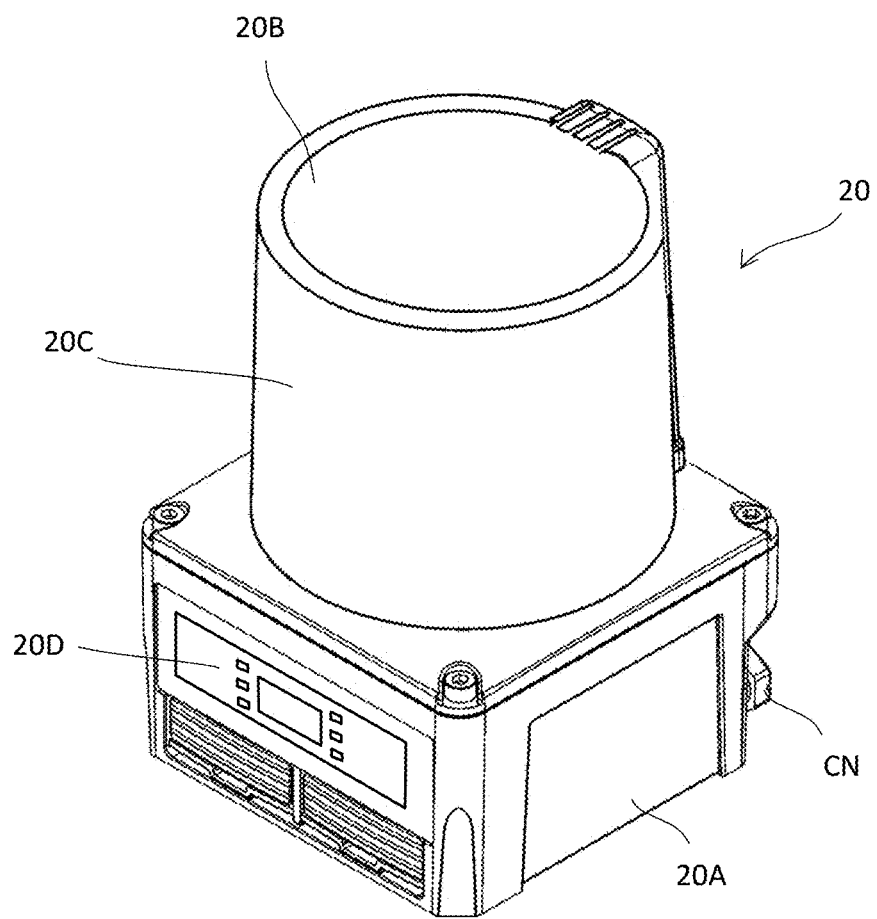
FIG. 3 illustrates an exterior of an object detection device.
Figure 4:
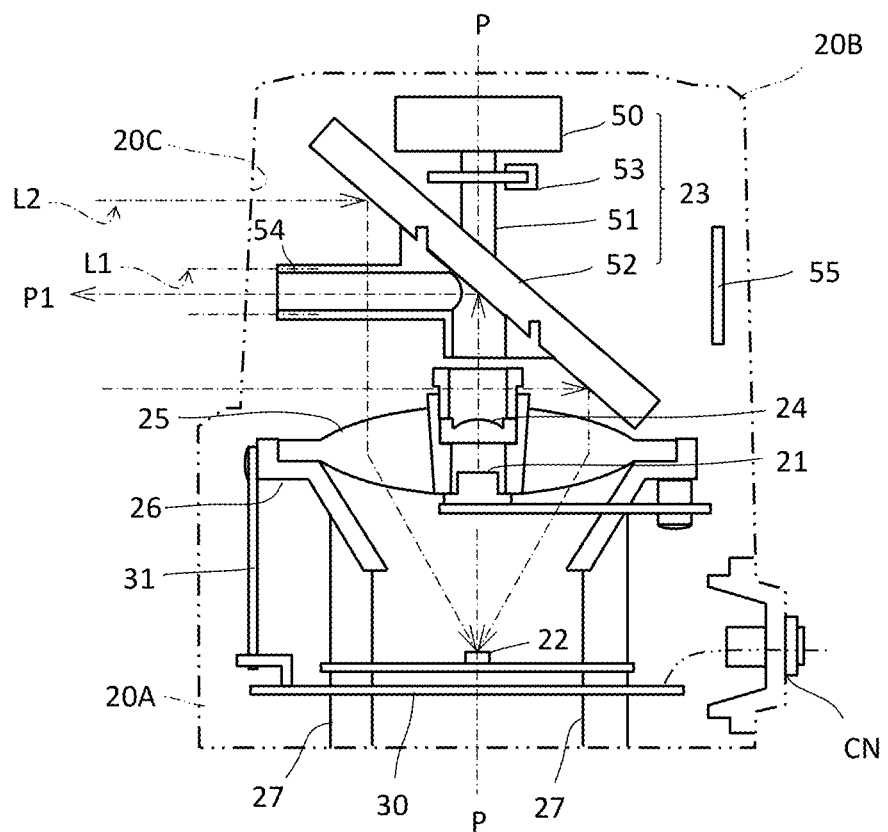
FIG. 4 is a sectional view of the object detection device.

FIG. 3 illustrates an exterior of the object detection device 20, and FIG. 4 illustrates an internal structure of the object detection device 20. As shown in FIG. 3, the object detection device 20 includes a generally cuboid lower casing 20A and an upper casing 20B provided with a generally cylindrical optical window 20C. The lower casing 20A is provided with a signal connection CN and a display unit 20D.

As shown in FIG. 4, the casings 20A and 20B of the object detection device 20 accommodate a light emitting element 21, a light receiving element 22, a scanning optical system 23, a projection lens 24, a light receiving lens 25, and signal processing boards 30, 31.

The scanning optical system 23 is composed of a motor 50 located at an inner wall at the top of the upper casing 20B, and a deflection mirror 52 fixed to a rotary shaft 51 of the motor 50 such that the deflection mirror 52 can rotate together. The deflection mirror 52 is angled at 45 degrees relative to the rotary shaft 51. Also, the rotary shaft 51 is provided with an encoder 53 to measure a rotation speed of the motor 50. The encoder 53 serves as a scanning angle detection unit for the measurement light.

The light receiving lens 25 and the light receiving element 22 are disposed at the opposite side of the deflection mirror 52 from the motor 50 and on an optical axis P that is coaxial with the rotary shaft 51 of the motor 50 arranged vertically. The light receiving lens 25 and the light receiving element 22 are at different vertical positions. The light receiving lens 25 is formed at its center with a cylindrically bored opening. The light emitting element 21 is disposed at a lower end of the opening, and the projection lens 24 is disposed above the light emitting element 21.

A light guide unit 54 is fixed to the deflection mirror 52 such that the light guide unit 54 rotates together with the deflection mirror 52. The light guide unit 54 separates a measurement light optical path L1 configured to guide measurement light deflected by the deflection mirror 52 to a measurement space, and a reflected light optical path L2 configured to allow deflection of reflected light by the deflection mirror 52 and thereby to guide the reflected light to the light receiving element 22.

The light emitting element 21 is composed of an infrared laser diode mounted on a cantilevered board. Coherent measurement light emitted from the laser diode is shaped into parallel light by the projection lens 24 and enters the deflection mirror 52 along the optical axis P, where the light is deflected by 90 degrees. The deflected measurement light passes along an optical axis P1 through the inner region defined by the light guide unit 54 (i.e., the measurement light optical path L1), and is emitted to the measurement space through the optical window 20C.

A surface of an object present in the measurement space is irradiated with the measurement light. A part of reflected light from the surface enters the optical window 20C along the optical axis P1 and passes through the outer region defined by the light guide unit 54 (i.e., the reflected light optical path L2) to be incident on the deflection mirror 52, where the light is deflected by 90 degrees. After deflected, the reflected light is focused by the light receiving lens 25 to be incident on the light receiving element 22.

The light receiving lens 25 has a peripheral flange portion that is supported by a lens holder 26. The board constituting the light emitting element 21 is supported by the lens holder 26. Additionally, a plurality of legs 27 supporting the lens holder 26 also supports the signal processing boards 30, 31 and a board mounted with the light receiving element 22.

The signal processing board 30 is provided with a controller 80 (see FIG. 5) to control the object detection device 20. The signal processing board 31 is mounted with light-emitting diodes (LEDs) and a liquid crystal display element for display of various kinds of information on the display unit 20D. The signal processing board 30 is connected to the light emitting element 21 and the light receiving element 22 with signal lines. A signal cable extends from the signal processing board 30 for signal exchange with the conveyance controller 40 of the transport vehicle via the signal connection CN provided at the lower casing 20A.

Figure 5:
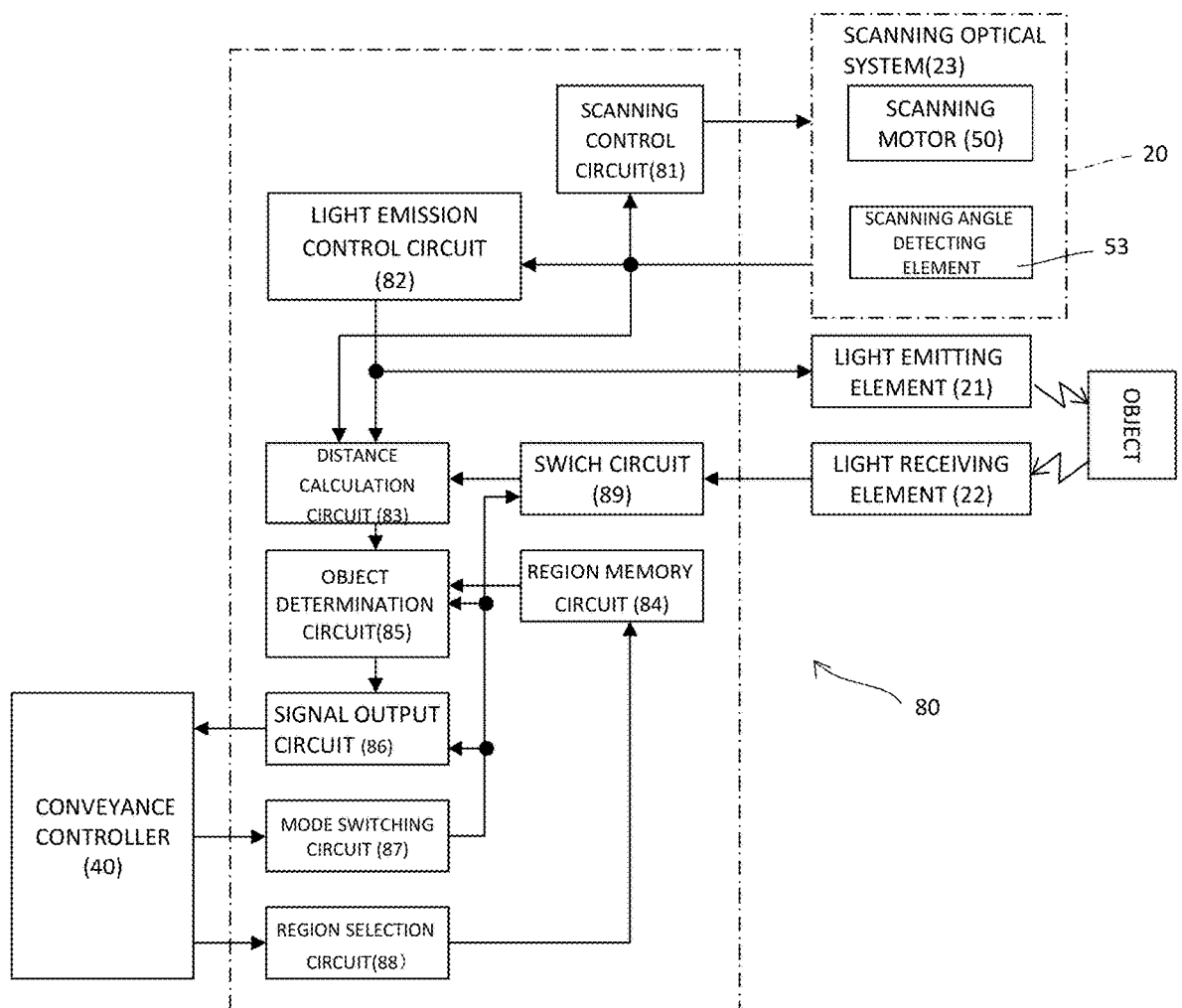
FIG. 5 is a functional block diagram of the object detection device.

FIG. 5 illustrates a functional block diagram of the controller 80. The controller 80 is composed of a plurality of integrated circuits, including a microcomputer or a digital signal processor having a CPU and a memory IC, and peripheral input/output circuits. A plurality of circuit blocks for achieving expected functions are implemented as the CPU executes control programs stored in the memory IC.

Specifically, the controller 80 includes a plurality of circuit blocks including, among others, a scanning control circuit 81, a light emission control circuit 82, a distance calculation circuit 83, a region memory circuit 84, an object determination circuit 85, a signal output circuit 86, a mode switching circuit 87, a region selection circuit 88, and a switch circuit 89.

The scanning control circuit 81 is a circuit block configured to drive the motor 50 based on a scanning angle detected by a scanning angle detecting element 53 and rotate the scanning optical system 23 at a predetermined rotation speed.

The light emission control circuit 82 is a circuit block configured to control light emission timing of the light emitting element 21 based on the scanning angle.

The distance calculation circuit 83 is a circuit block configured to calculate a distance to a detected object based on physical relationship between measurement light scanned by the scanning optical system 23 and reflected light from the detected object, i.e., based on a time or phase difference between the measurement light and the reflected light, and to determine the scanning angle at which the object is detected as the direction of the object. The region memory circuit 84 is a circuit block configured to store monitoring regions.

The object determination circuit 85 is a circuit block configured to determine whether the distance and direction to the object calculated by the distance calculation circuit 83 is within a certain monitoring region stored in the region memory circuit 84. The signal output circuit 86 is a circuit block configured to output an object detection signal when the object determination circuit 85 determines that the object is within the monitoring region.

The mode switching circuit 87 is a circuit block configured to switch the distance calculation circuit 83, the object determination circuit 85, and the signal output circuit 86 to either a first mode or a second mode. The first mode is a mode in which the distance calculation circuit 83, the object determination circuit 85, and the signal output circuit 86 operate regardless of an intensity of the reflected light received by the light receiving element 22. The second mode is a mode in which the distance calculation circuit 83, the object determination circuit 85, and the signal output circuit 86 operate when the intensity of the reflected light received by the light receiving element 22 is at or above a predetermined threshold and any of the distance calculation circuit 83, the object determination circuit 85, and the signal output circuit 86 is inhibited from operating when the intensity of the reflected light received by the light receiving element 22 is below the predetermined threshold.

The switch circuit 89 is a circuit block configured to, in response to selection of the first mode, output an output signal from the light receiving element 22 to the distance calculation circuit 83 regardless of the reflected light intensity and, in response to selection of the second mode, output the output signal from the light receiving element 22 to the distance calculation circuit 83 only when the reflected light intensity is at or above the predetermined threshold and inhibit the output signal from the light receiving element 22 from being input to the distance calculation circuit 83 when the reflected light intensity is below the predetermined threshold.

In the present embodiment, when the second mode is selected, the switch circuit 89 inhibits the reflection signal from being input to the distance calculation circuit 83, so that all of the distance calculation circuit 83, the object determination circuit 85, and the signal output circuit 86 do not operate.

In an alternative embodiment, the switch circuit 89 may be absent and each of the distance calculation circuit 83, the object determination circuit 85, and the signal output circuit 86 may individually determine which of the first and second modes has been selected and operate as expected accordingly.

In this case, the reflection signal corresponding to the reflected light received by the light receiving element 22 may be input to the distance calculation circuit 83, and determination of whether the intensity of the reflection signal is at or above the predetermined threshold may be determined when the distance calculation circuit 83 calculates the distance and direction to the object. The determination result may be output to each of the object determination circuit 85 and the signal output circuit 86.

A distance calculation method, called time-of-flight (TOF) method, is based on a time difference between measurement light and reflected light. In the TOF method, a distance d is calculated by the following expression 1, where C is the speed of light, and ΔT is a time difference.

$$d=(½)\times C \times \Delta T \qquad \text{[Expression 1]}$$

A distance calculation method, called amplitude modulation (AM) method, is based on a phase difference between measurement light and reflected light, with the measurement light from a light source being subjected to amplitude modulation at a predetermined modulation frequency. In the AM method, a distance d is calculated by the following expression 2, where φ is a measured phase difference, C is the speed of light, and F is a modulation frequency of the light source.

$$d=(½)\times(\varphi/2\pi)\times C/F \qquad \text{[Expression 2]}$$

The distance calculation circuit 83 is provided with a correction calculation circuit configured to correct an error due to factors such as variation in components of the object detection device 20. Thus, the distance calculation circuit 83 obtains a correction coefficient such that a distance calculated based on reflected light from a reference reflector 55 (see FIG. 4), located at a portion of the inner wall of the upper casing 20B, is a predetermined distance, and outputs a value obtained by correcting, with the correction coefficient, the distance calculated by either of the above expressions. The following description relates to an example of employing the TOF method, but is also applicable to the case of employing the AM method.

The object determination circuit 85 determines, based on the distance and direction output from the distance calculation circuit 83, whether the object is present within a certain monitoring region stored in the region memory circuit 84. Upon determining that the object is present within the monitoring region, the object determination circuit 85 outputs a signal indicative of that to the conveyance control circuit 41 via the signal output circuit 86.

In FIG. 1A, a monitoring region R1 (composed of three regions Ra, Rb, Rc in the order of proximity to the transport vehicle 2) set for transport vehicles 2 traveling on a straight section of the route 1 is shown by dashed lines, and monitoring regions R2 set for transport vehicles 2 traveling on a curved section of the route 1 are shown by dashed lines.

Upon detection of an obstacle in the region Ra while the transport vehicle 2 is traveling on the straight section, the object determination circuit 85 outputs a signal indicative of a stop instruction to the conveyance control circuit 41 via the signal output circuit 86. Upon detection of an obstacle in the region Rb while the transport vehicle 2 is traveling on the straight section, the object determination circuit 85 outputs a signal indicative of a slowdown instruction to the conveyance control circuit 41 via the signal output circuit 86. Upon detection of an obstacle in the region Rc while the transport vehicle 2 is traveling on the straight section, the object determination circuit 85 outputs a signal indicative of an alert instruction to the conveyance control circuit 41 via the signal output circuit 86. In response to the alert instruction, the conveyance control circuit 41 causes the transport vehicle 2 to travel at a constant speed without accelerating, for example.

Upon detection of an obstacle in the region R2 while the transport vehicle 2 is traveling on the curved section, the object determination circuit 85 outputs a signal indicative of a stop instruction to the conveyance control circuit 41 via the signal output circuit 86.

While the transport vehicle 2 is traveling on the straight section, in which the transport vehicle 2 travels at a high speed, the monitoring region R1 extends sufficiently far along the traveling direction in order to provide sufficient time to slow down and then stop the transport vehicle 2 in the event of detection of an obstacle. While the transport vehicle 2 is traveling on the curved section, in which the transport vehicle 2 travels at a low speed, the monitoring region R2 is widened in the width direction intersecting the traveling direction so that the transport vehicle ahead is not lost. That is, a monitoring region suitable for a particular conveyance environment is selected from among the plurality of monitoring regions stored in the region memory circuit 84, based on the region selection signal sent from the transport vehicle 2 according to the traveling location thereof. The plurality of monitoring regions are prestored in the region memory circuit 84 by an external controller.

That is, based on the traveling location information identified by the traveling location monitoring circuit 43 of the transport vehicle 2, the monitoring region selection signal output circuit 49 provided in the conveyance control circuit 41 outputs, to the controller 80 of the object detection device 20, the monitoring region selection signal to switch to an appropriate monitoring region. The region selection circuit 88, in turn, reads a monitoring region corresponding to the monitoring region selection signal from the plurality of monitoring regions pre-stored in the region memory circuit 84 and uses that monitoring region as a monitoring region for determination of obstacles.

While the two types of monitoring regions R1, R2 are set in the present embodiment, a number of types of monitoring regions may be set according to the shape of the route 1 or facility situations. When the transport vehicle 2 travels at a high speed, a monitoring region extended farther along the traveling direction can be set, and when the transport vehicle 2 travels at a relatively low speed in an open space, a monitoring region widened in a direction (width direction) perpendicular to the traveling direction can be set. In other words, monitoring regions can be switched according to the speed of the transport vehicle 2. In this case, switching to a more appropriate monitoring region is also possible based on the traveling location information identified by the traveling location monitoring circuit 43 of the transport vehicle 2.

Since the monitoring region R2 during the travel on the curved section is wide in the width direction, the safety fence G installed around the curved section may be included in the monitoring region R2, so that the object determination circuit 85 may erroneously detect the safety fence G as an obstacle and output a stop instruction. However, narrowing the monitoring region R2 to exclude the safety fence G to avoid such situations may result in late detection of the transport vehicle 2 ahead, with the result that an unavoidable collision therewith may occur.

Hence, and based on the fact that surfaces of general facilities, such as the safety fence G, are light-scattering surfaces, the mode switching circuit 87 described above is provided to enable clear identification of the transport vehicles 2 from other objects without needing to narrow the monitoring region R2.

General facilities installed near the route 1, such as the safety fence G, that can be excluded from monitoring targets may have light-scattering surfaces or may have surfaces that are covered with a light absorption member to reduce the reflected light intensity.

As described above, when the mode switching circuit 87 switches to the first mode, the distance calculation circuit 83, the object determination circuit 85, and the signal output circuit 86 operate regardless of the intensity of the reflected light received by the light receiving element 22, and the signal output circuit 86 outputs a detection result upon detection of an object within the monitoring region.

When the mode switching circuit 87 switches to the second mode, the distance calculation circuit 83, the object determination circuit 85, and the signal output circuit 86 operate when the intensity of the reflected light received by the light receiving element 22 is at or above a predetermined threshold, and any of the distance calculation circuit 83, the object determination circuit 85, and the signal output circuit 86 is inhibited from operating when the intensity of the reflected light received by the light receiving element 22 is below the predetermined threshold.

Thus, in the second mode, only when the reflected light intensity is at or above the predetermined threshold, the signal output circuit 86 outputs a detection result upon detection of an object within the monitoring region, and when the reflected light intensity is below the predetermined threshold, the signal output circuit 86 does not output an object detection signal despite the presence of an object within the monitoring region.

The switch circuit 89 may be a comparator that separates a signal intensity detected by the light receiving element 22 based on the light reflected by the light-scattering surfaces, such as the safety fence G, from a signal intensity detected by the light receiving element 22 based on the light reflected by the retroreflective sheets 2A, 2B provided to the transport vehicle 2.

The comparator allows a reflection signal corresponding to the reflection signal from the retroreflective sheets 2A, 2B, whose voltage is higher than a predetermined threshold voltage, to be output to the distance calculation circuit 83, and blocks a reflection signal corresponding to the reflection signal from the light-scattering surfaces, whose voltage is lower than the predetermined threshold voltage.

Instead of the comparator, the switch circuit 89 may be composed of an analog switch that passes a signal corresponding to the reflected light detected by the light receiving element 22 when its voltage is higher than a predetermined threshold voltage and blocks the signal when its voltage is lower than the predetermined threshold voltage.

The comparator is preferred in the case of employing the TOF method, and the analog switch is preferred in the case of employing the AM method.

Based on the traveling location monitored by the traveling location monitoring circuit 43, the mode switching signal output circuit 48 provided in the transport vehicle 2 outputs a mode switching signal to the mode switching circuit 87 for switching either to the first mode or the second mode.

Based on the traveling location monitored by the traveling location monitoring circuit 43, the monitoring region selection signal output circuit 49 provided in the transport vehicle 2 outputs a monitoring region selection signal to the region selection circuit 88, which, in turn, specifies a monitoring region used for determination by the object determination circuit 85, from among the plurality of monitoring regions stored in the region memory circuit 84.

In the present embodiment, the monitoring region is switched to the monitoring region R2 and the first mode is switched to the second mode when the transport vehicle 2 travels on a curved section, and the monitoring region is switched to the monitoring region R1 and the second mode is switched to the first mode when the transport vehicle 2 travels on the straight section. In other words, switching between the first and second modes is performed in synchronization with switching of the monitoring regions.

That is, the mode switching circuit 87 is capable of switching either to the first mode or the second mode for each monitoring region selected by the region selection circuit 88. Also, the mode switching signal output circuit 48 outputs, to the mode switching circuit 87, a mode switching signal to switch to either the first mode or the second mode for each monitoring region corresponding to the region selection signal output from the monitoring region selection signal output circuit 49.

The monitoring regions are pre-stored in the region memory circuit 84 via an external device, and a sufficient number of regions can be stored depending on the memory capacity. The first mode or the second mode can be assigned in association with each monitoring region, which allows for the mode switching settings concurrently with the monitoring region switching settings. In this case, the mode switching signal output circuit 48 does not need to be activated.

In FIG. 1A, only one region is set for each monitoring region R2. However, similarly to the monitoring region R1, a plurality of monitoring regions (e.g., regions R2a, R2b, R2c in the order of proximity to the transport vehicle 2) may be set such that object detection signals (e.g., output 1, output 2, output 3) respectively corresponding to the monitoring regions R2a, R2b, R2c are output. The traveling control circuit 42 provided in the transport vehicle 2 performs an emergency stop control in response to the output 1, performs a slowdown control in response to the output 2, or performs an alert control (e.g., not accelerating the transport vehicle 2) in response to the output 3. The first mode or the second mode may be individually set for each of the regions R2a, R2b, R2c.

It is preferable that the switching of the monitoring regions R1, R2 occurs in synchronization with the operation of the mode switching circuit 87. This is, however, not essential because there may be a case where the switching between the first and second modes is required even in the same monitoring region, depending on the traveling location or traveling speed of the transport vehicle 2. Also, while the monitoring regions are switched according to the traveling location of the transport vehicle 2, this is not essential either.

In addition to the above embodiment, the mode switching signal output circuit 48 provided in the transport vehicle 2 is configured to output a mode switching signal to switch to the second mode when location information about the transport vehicle ahead is unavailable.

The host controller HC is configured to communicate with each transport vehicle 2 and identify which transport vehicle 2 is traveling at which location on the route 1. Hence, generally, the host controller HC identifies location information about another transport vehicle 2 traveling ahead of a particular transport vehicle 2 and controls traveling of these transport vehicles 2 by preliminarily adjusting a distance between them.

However, during, for example, a startup of the system, the order of the transport vehicles 2 cannot be identified until the traveling location of each transport vehicle 2 is identified.

Also, in the event of a communication failure due to a malfunction of a transport vehicle 2, outputting a travel instruction to another transport vehicle 2 may result in unexpected situations such as collisions.

Hence, when the host controller HC is unable to acquire location information about a transport vehicle 2 ahead, a subsequent transport vehicle 2 that is expected to travel behind that transport vehicle 2 is instructed to switch to the second mode. Thus, the mode switching signal output circuit 48 of the subsequent transport vehicle 2 outputs, to the object detection device 20, a mode switching signal to switch to the second mode. In so doing, any unexpected collision can be avoided. In this case, it is preferable for the subsequent transport vehicle 2 traveling behind to travel at a lower traveling speed than a normal traveling speed.

The cases where the location information about the transport vehicle 2 ahead is unavailable include, for example, a case where the cart number of the transport vehicle 2 ahead cannot be identified until the order of transport vehicles is identified and confirmed by the host controller HC, a case where the current location of the transport vehicle 2 ahead is rendered unknown due to a malfunction of its traveling system, and a case where the power of the transport vehicle 2 ahead is lost.

Figure 6A:
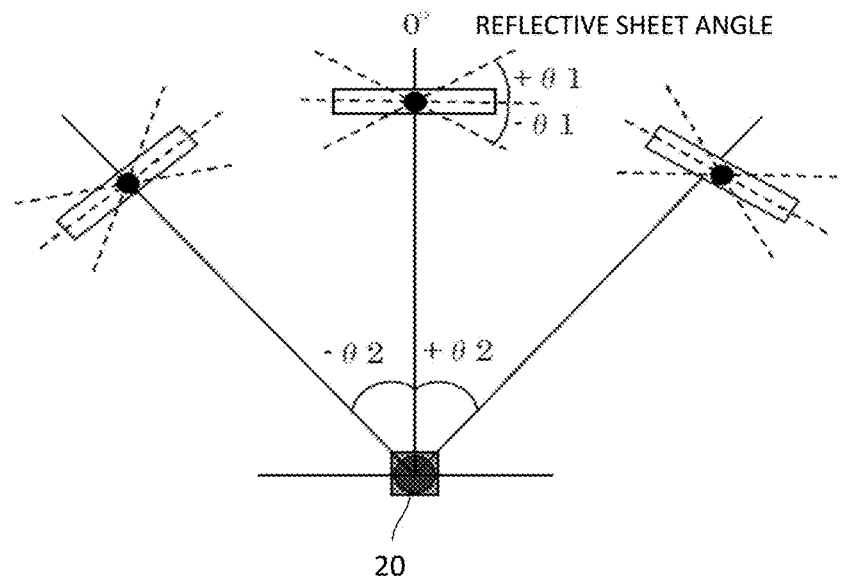
FIG. 6A illustrates a positional relationship between the object detection device and a reflective sheet in performing a reflected light intensity test.
Figure 6B:
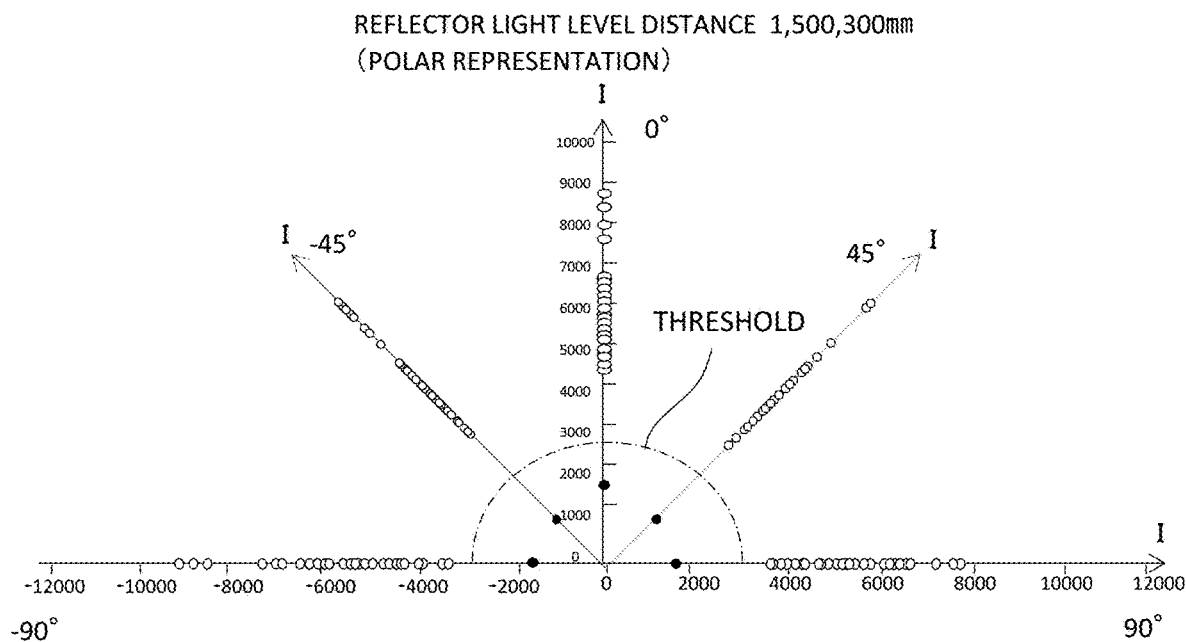
FIG. 6B illustrates a result of the reflected light intensity test and a threshold for a first mode and a second mode.

FIG. 6A illustrates variations of a scanning direction angle θ2 of the measurement light from the object detection device 20 and an angle θ1 between a plane perpendicular to the optical axis of the measurement light and a reflection sheet. FIG. 6B illustrates characteristics of reflected light intensities detected by the light receiving element 22 for two types of reflective sheets (a retroreflective sheet and a light-scattering reflective sheet), based on the above angular variations. White Kent paper is used as the light-scattering reflective sheet.

FIG. 6B illustrates the characteristics when the angle θ1 is varied within a range of ±45 degrees with respect to the scanning direction angle θ2 of 90 degrees (45 degrees to the right and left), with the scanning direction of the measurement light along the straight travel direction of the transport vehicle 2 being defined as 0 degrees. In the figures, white circles represent the characteristics of the retroreflective sheet, and black circles represent those of the light-scattering reflective sheet. The distance between the retroreflective sheet and the object detection device 20 is set to 1500 mm and 300 mm, and the distance between the light-scattering reflective sheet and the object detection device 20 is set to 300 mm.

As shown in FIG. 6B, even when the light-scattering reflective sheet is located at the short distance of 300 mm, the reflected light intensity from the light-scattering reflective sheet is sufficiently lower than that from the retroreflective sheet located at the long distance of 1500 mm. This means that, by setting a predetermined threshold between these sheets, as indicated by a dashed line in the figure, they can be identified from each other within a range of 300 to 1500 mm from the object detection device 20. That is, employing the second mode, in which only the reflected light at or above the predetermined threshold is detected, can eliminate the effect of light-scattering reflectors such as the safety fence G, and employing the first mode, in which all reflected light including one below the predetermined threshold is detected, allows for utilization of all reflected light for obstacle detection.

Figure 7:
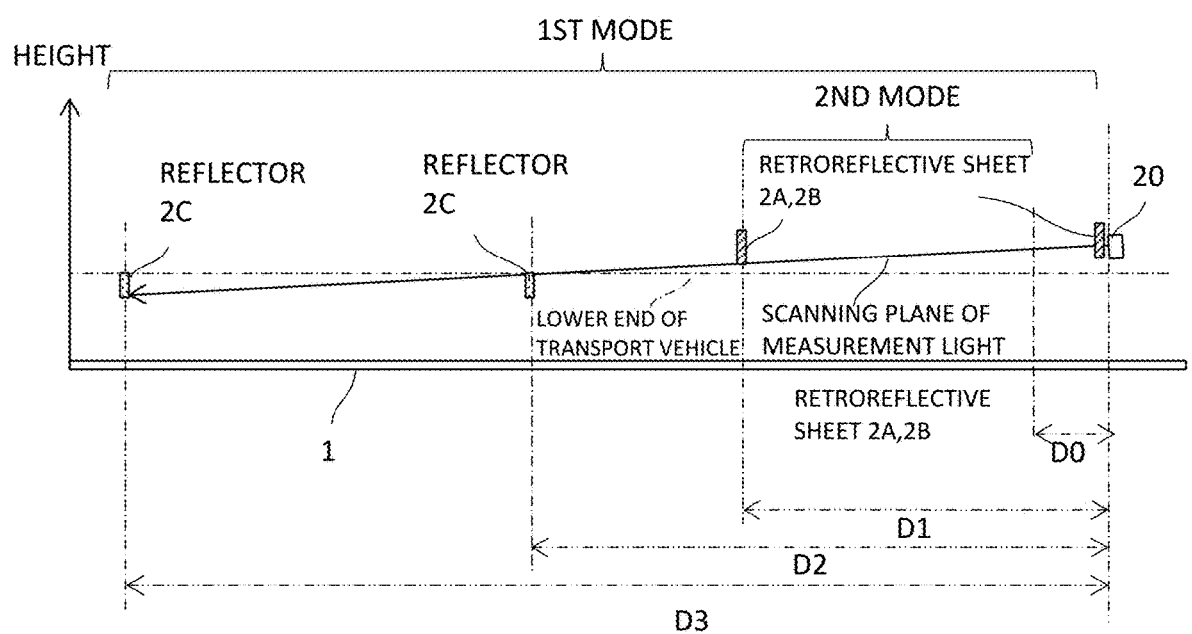
FIG. 7 illustrates switching between the first mode and the second mode.

FIG. 7 illustrates relationship between the height of the reflective sheets 2A, 2B and the light-scattering reflector 2C disposed at the rear side of the transport vehicle 2 traveling ahead and the scanning plane of the measurement light emitted from the object detection device 20 disposed at the front side of the transport vehicle 2 traveling behind, with reference to the rail surface of the route 1.

The scanning plane is inclined downward by 3 degrees from the horizontal plane so that the measurement light from the object detection device 20 of each transport vehicle 2 is not detected as stray light with respect to each other. For this reason, the measurement light is offset further downward from the horizontal plane as the distance between the carts increases. It should be noted that the inclination angle of the scanning plane with respect to the horizontal plane is not limited to a particular value.

D1 is a distance within which, by specification, objects can be detected in the second mode. D3 is a distance within which the transport vehicle 2 ahead needs to be detected in a normal traveling section, such as during traveling on a straight section, and the first mode is used to detect objects.

Since the transport vehicles 2 travel in curve sections at a lower speed than when traveling in normal traveling sections, a relationship of D1<D3 is generally established. In curve sections, it is required to discriminate the transport vehicle 2 ahead from surrounding protective walls to detect only the transport vehicle 2 ahead. As such, the object detection is performed in the second mode.

Thus, to detect the transport vehicle 2 ahead within the cart distance D1, the retroreflective sheets 2A, 2B, which are attached to the rear side of the transport vehicle 2, are provided at the height at which the reflected light for the measurement light emitted from the object detection device 20 is detected by the object detection device 20 within the cart distance D1.

At cart distances beyond D2, the scanning plane of the measurement light drops below a bumper of the transport vehicle ahead, so that the reflected light may not return to the object detection device 20. Thus, to ensure detection of the transport vehicle ahead even at cart distances beyond D2, the reflector 2C is provided at the height at which the reflected light can be surely detected by the object detection device 20 even at cart distances beyond D2.

At distances within D0, reflected light intensities of the reflected light from general light-scattering reflectors, such as white Kent paper, and that from the retroreflective sheets are too close to be separated from each other. Hence, the detection range in the second mode extends from D1 to D0. D3 is the maximum distance within which objects can be detected, and varies depending on the performance of the object detection device 20. In the first mode, objects can be detected within the distance D3. In the present embodiment, D0=300 mm, D1=1500 mm, D2=1900 mm, and D3=5500 mm. D0 and D1 are determined from the evaluation results shown in FIG. 6, and determined as appropriate by taking account of the performance of the object detection device, the performance of the retroreflective reflectors, and other factors.

Figure 8:
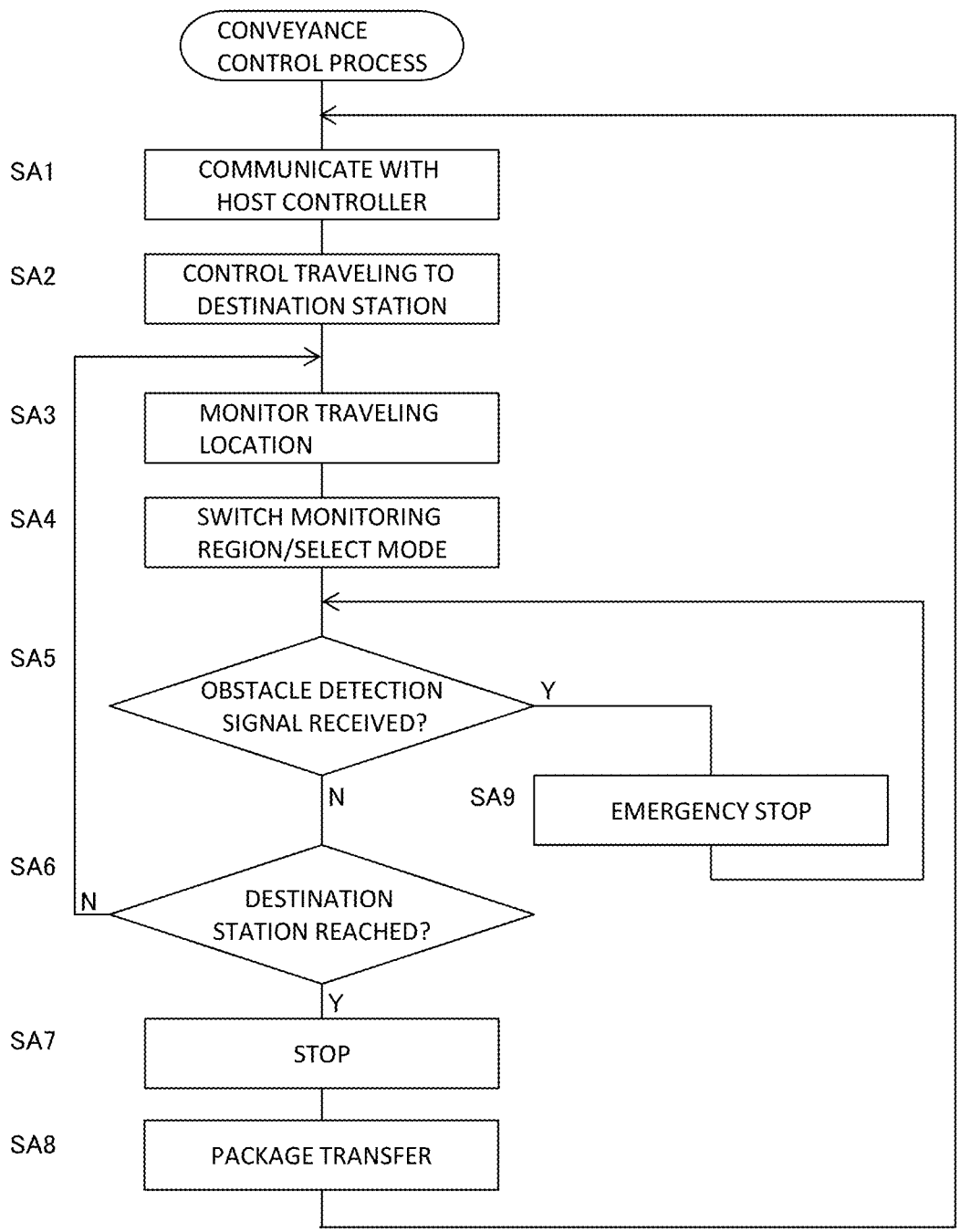
FIG. 8 is a flowchart of a conveyance procedure.

FIG. 8 illustrates a conveyance control procedure performed by the conveyance controller 40. The conveyance controller 40 performs a predetermined communication with the host controller HC and receives an instruction to travel to a predetermined station 3 (SA1). Then, the traveling control circuit 42 drives the traveling motor to control traveling to the destination station 3 (SA2).

During the traveling, the traveling location is monitored by the traveling location monitoring circuit 43 (SA3). The mode switching signal output circuit 48 outputs an instruction to the object detection device 20 to set a monitoring region for straight sections while the transport vehicle 2 is traveling on a straight section to detect obstacles in the first mode, and when the transport vehicle 2 enters a curved section, the mode switching signal output circuit 48 outputs an instruction to the object detection device 20 to set a monitoring region for curved sections to detect obstacles in the second mode (SA4).

When the first and second modes are pre-stored in the region memory circuit 84 of the object detection device 20 in association with corresponding monitoring regions, the first and second modes may be automatically selected once the monitoring region selection signal is output to the object detection device 20.

In response to input of an obstacle detection signal (stop instruction) from the object detection device 20 (Y at SA5), the conveyance control circuit 41 immediately stops the transport vehicle 2 and waits until the obstacle detection signal is removed (SA9). Steps SA3 to SA5 and SA9 are repeated until the transport vehicle 2 arrives at the destination station 3 (N at SA6) without input of the obstacle detection signal (N at SA5). During traveling on a straight section, when a slowdown instruction is input from the object detection device 20 in association with the monitoring region Rb, the transport vehicle 2 is controlled to slow down, and when an alert instruction is input from the object detection device 20 in association with the monitoring region Rc, the transport vehicle 2 is, for example, controlled to stop accelerating and travel at a constant speed.

Once the transport vehicle 2 arrives at the destination station 3 (Y at SA6), the conveyance control circuit 41 stops the transport vehicle 2 (SA7) to transfer a package to or from the station 3 (SA6). Thus, steps SA1 to SA8 are repeated.

Figure 9:
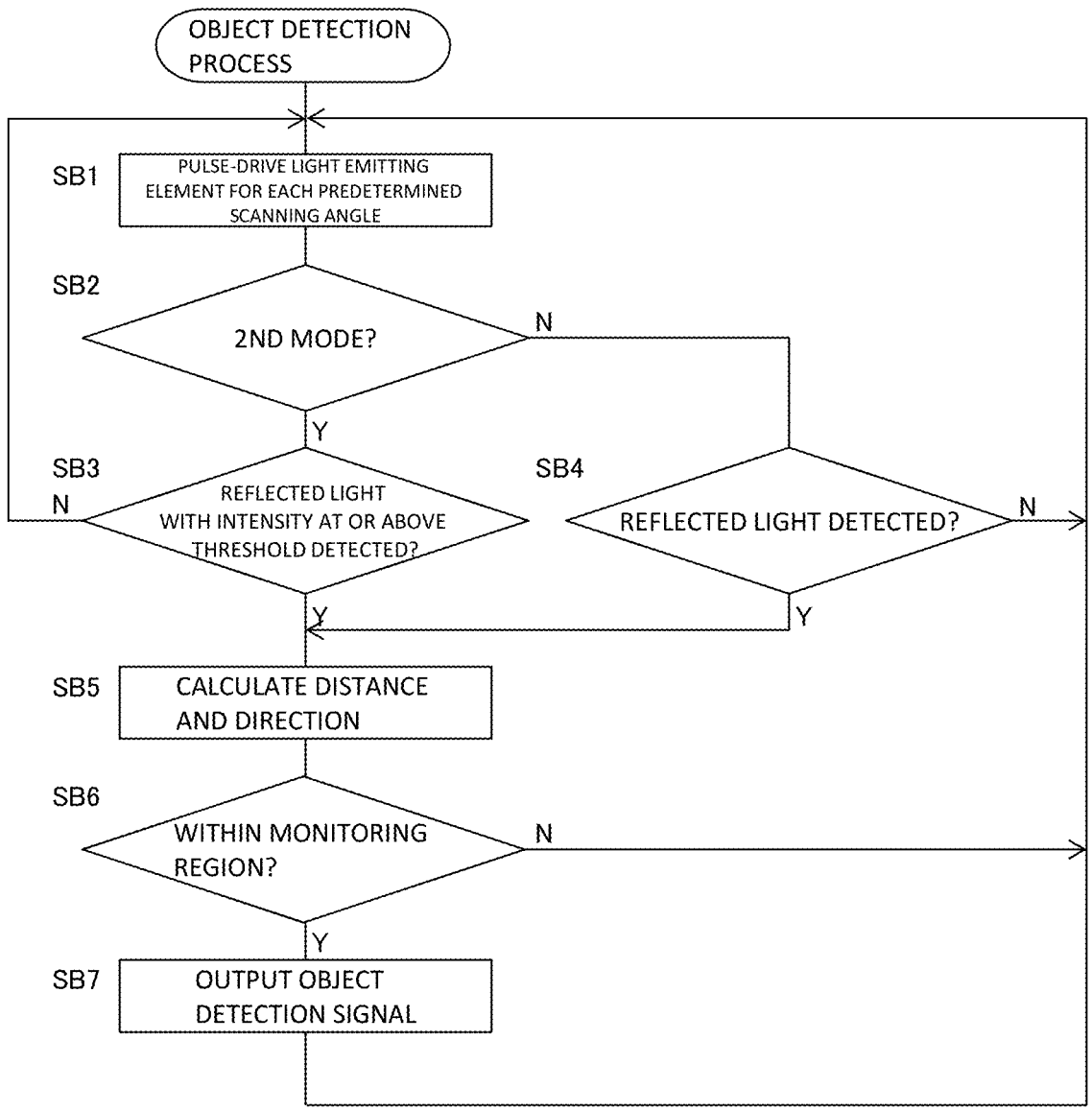
FIG. 9 is a flowchart of an object detection procedure.

FIG. 9 illustrates a processing procedure performed by the controller 80 of the object detection device 20. The scanning control circuit 81 provided in the controller 80 activates the scanning motor 50 and rotates it at a predetermined target speed based on encoder pulses that are outputs from the scanning angle detecting element 53. At certain scanning angles based on the encoder pulses, the light emission control circuit 82 drives the light emitting element 21 to output pulse light (SB1).

If the second mode is selected (Y at SB2), steps SB1 to SB3 are repeated until reflected light with an intensity at or above a predetermined threshold is detected. If the second mode is not selected (N at SB2), steps SB1, SB2, SB4 are repeated until any reflected light is detected.

Once the reflected light is detected at either step SB3 or SB4, the distance calculation circuit 83 calculates a distance and a direction to the object (SB5), and the object determination circuit 85 determines whether the distance and direction calculated are within the monitoring region (SB6). If the object determination circuit 85 determines that the obstacle is present within the monitoring region (Y at SB6), an obstacle detection signal is output to the transport vehicle 2 (SB7).

While the flowchart of FIG. 9 shows that steps SB2, SB3, SB4 for selection of the second mode and the threshold determination are performed between steps SB1 and SB5, these steps SB2, SB3, SB4 may be performed between steps SB6 and SB7. Additionally, while the mode determination and the object determination are made for each scanning angle in FIG. 9, all measured distances, scanning angles, and reflected light intensities within a predetermined scanning angular range may be first accumulated in a memory device and then steps SB2 to SB7 may be performed. The order and content of the processes are not limited to those described above.

Figure 10:
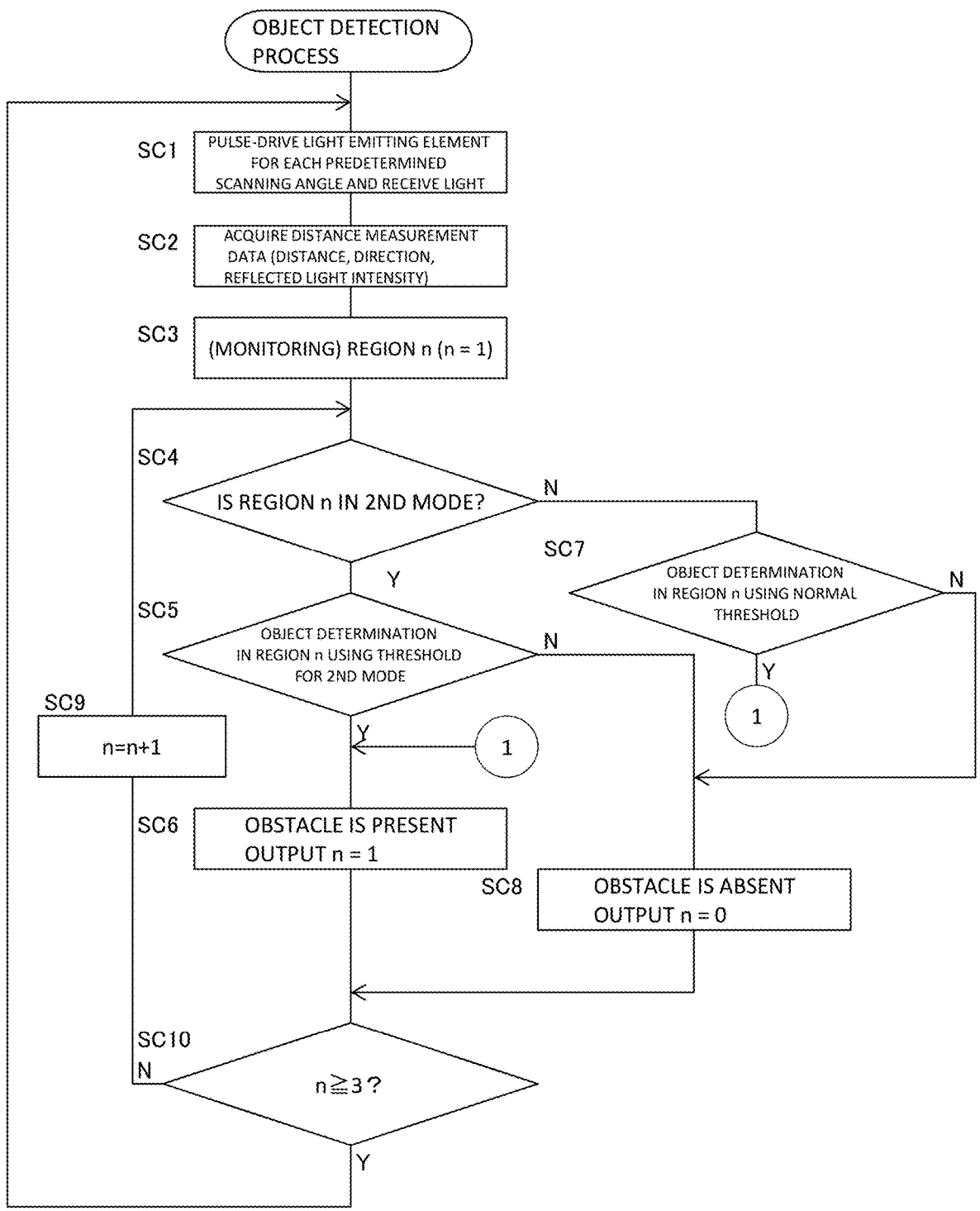
FIG. 10 is a flowchart of an object detection procedure in accordance with an alternative embodiment.

FIG. 10 shows an object detection procedure executed for each scanning period of the measurement light. The figure shows a care where a region set as a monitoring region is divided into n regions, rather than a single region. For example, n=3 when the region consists of the three regions of Ra, Rb, Rc, like the region R1 in FIG. 1.

In the above embodiment, the distance calculation circuit, the object determination circuit, and the signal output circuit operate regardless of the reflected light intensity received by the light receiving element 22 in the first mode. However, this is not intended to exclude a process of removing minor reflected light to remove noise; the first mode may include removing noise based on a sufficiently low threshold.

In the above embodiment, all of the distance calculation circuit 83, the object determination circuit 85, and the signal output circuit 86 operate in the first mode, and none of these circuits operate in the second mode. However, only any one of the distance calculation circuit 83, the object determination circuit 85, and the signal output circuit 86 may be switched to a non-operation state when the second mode is selected.

As described above, the object detection system in accordance with the present invention includes a transport vehicle including a traveling mechanism configured to travel along a predetermined route and an object detection device mounted on the transport vehicle.

The object detection device includes: a light emitting element; a light receiving element; a scanning optical system configured to scan a space by measurement light emitted from the light emitting element and guide reflected light from an object for the measurement light to the light receiving element; a distance calculation circuit configured to calculate a distance and a direction to the object based on physical relationship between the measurement light emitted from the light emitting element and the reflected light detected by the light receiving element; a region memory circuit configured to store a monitoring region; an object determination circuit configured to determine whether the distance and the direction to the object calculated by the distance calculation circuit are within the monitoring region stored in the region memory circuit; a signal output circuit configured to output an object detection signal when the object determination circuit determines that the object is within the monitoring region; and a mode switching circuit configured to switch to either a first mode or a second mode, the first mode being a mode in which the distance calculation circuit, the object determination circuit, and the signal output circuit operate regardless of an intensity of the reflected light received by the light receiving element, the second mode being a mode in which the distance calculation circuit, the object determination circuit, and the signal output circuit operate when the intensity of the reflected light received by the light receiving element is at or above a predetermined threshold and any of the distance calculation circuit, the object determination circuit, and the signal output circuit is inhibited from operating when the intensity of the reflected light received by the light receiving element is below the predetermined threshold.

The transport vehicle includes: a traveling control circuit configured to control the traveling mechanism to control traveling of the transport vehicle to a predesignated station and to slow down or stop the transport vehicle based on the object detection signal output from the signal output circuit; and a mode switching signal output circuit configured to output, to the mode switching circuit, a mode switching signal to switch to either the first mode or the second mode.

The mode switching signal output circuit is further configured to output a mode switching signal to switch to the second mode when location information about a transport vehicle ahead is unavailable.

The transport vehicle further includes a traveling location monitoring circuit configured to monitor a traveling location along the route, and the mode switching signal output circuit is configured to output, to the mode switching circuit, a mode switching signal to switch to either the first mode or the second mode based on the traveling location monitored by the traveling location monitoring circuit.

The object detection device further includes a region selection circuit configured to select a monitoring region used for determination by the object determination circuit, from among a plurality of monitoring regions stored in the region memory circuit. The transport vehicle further includes a monitoring region selection signal output circuit configured to output, to the region selection circuit, a region selection signal to select a monitoring region used for determination by the object determination circuit, based on the traveling location monitored by the traveling location monitoring circuit.

The mode switching circuit is configured to be switchable to either the first mode or the second mode for each monitoring region selected by the region selection circuit.

The mode switching signal output circuit is configured to output, to the mode switching circuit, a mode switching signal to switch to either the first mode or the second mode for each monitoring region corresponding to a region selection signal output from the monitoring region selection signal output circuit.

A particular highly reflective sheet from which reflected light received by the light receiving element has an intensity at or above the predetermined threshold is disposed at a rear end of the transport vehicle. In the second mode, only an output reflected from the highly reflective sheet of a transport vehicle ahead and received by the light receiving element is output to the distance calculation circuit.

The embodiment described above is merely exemplary and in no way intended to limit the technical scope of the present invention. It will be readily understood that modifications may be made as appropriate to specific configurations of the respective components to the extent that such modifications ensure the advantageous effects of the present invention.

REFERENCE SIGNS LIST

1 Route (rail)
2 Transport vehicle
2A, 2B Highly reflective sheet (retroreflective sheet)
2C Reflector (light-scattering reflective sheet)
3 Station
20 Object detection device
21 Light emitting element
22 Light receiving element
23 Scanning optical system
24 Projection lens
25 Light receiving lens
40 Conveyance controller
41 Conveyance control circuit
42 Traveling control circuit
43 Traveling location monitoring circuit
44 Conveyor control circuit
45 Route memory circuit
46 First communication interface
47 Second communication interface
48 Mode switching signal output circuit
49 Monitoring region selection signal output circuit
80 Controller
81 Scanning control circuit
82 Light emission control circuit
83 Distance calculation circuit
84 Region memory circuit
85 Object determination circuit
86 Signal output circuit
87 Mode switching circuit
88 Region selection circuit
89 Switching circuit
100 Logistics management facility

The invention claimed is:

1. An object detection system comprising:
a transport vehicle including a traveling mechanism configured to travel along a predetermined route; and
an object detection device mounted on the transport vehicle, wherein
the object detection device includes:
  a light emitting element;
  a light receiving element;
  a scanning optical system configured to scan a space by measurement light emitted from the light emitting element and guide reflected light from an object for the measurement light to the light receiving element; and
  a first hardware processor configured to:
    (i) calculate a distance and a direction to the object based on physical relationship between the measurement light emitted from the light emitting element and the reflected light detected by the light receiving element;
    (ii) store a monitoring region in a memory;
    (iii) determine whether the distance and the direction to the object are within the monitoring region stored in the memory;
    (iv) output an object detection signal when the first hardware processor determines that the object is within the monitoring region; and
    (v) switch to either a first mode or a second mode, the first mode being a mode in which the first hardware processor performs (i), (iii), and (iv) regardless of an intensity of the reflected light received by the light receiving element, the second mode being a mode in which the first hardware processor performs (i), (iii), and (iv) when the intensity of the reflected light received by the light receiving element is at or above a predetermined threshold and the first hardware processor is inhibited from performing any of (i), (iii), and (iv) when the intensity of the reflected light received by the light receiving element is below the predetermined threshold, and wherein
the transport vehicle includes:
  a second hardware processor configured to:
    control the traveling mechanism to control traveling of the transport vehicle to a predesignated station and to slow down or stop the transport vehicle based on the object detection signal output from the first hardware processor; and
    output, to the first hardware processor, a mode switching signal to switch to either the first mode or the second mode.

2. The object detection system according to claim 1, wherein
the second hardware processor is configured to output the mode switching signal to switch to the second mode when location information about a transport vehicle ahead is unavailable.

3. The object detection system according to claim 1, wherein
the second hardware processor is further configured to:
monitor a traveling location along the route, and
output, to the first hardware processor, a mode switching signal to switch to either the first mode or the second mode based on the traveling location monitored by the second hardware processor.

4. The object detection system according to claim 3, wherein
the first hardware processor is further configured to select the monitoring region from among a plurality of monitoring regions stored in the memory, and
the second hardware processor is further configured to output, to the first hardware processor, a region selection signal to select the monitoring region based on the traveling location monitored by the second hardware processor.

5. The object detection system according to claim 4, wherein
the first hardware processor is further configured to be switchable to either the first mode or the second mode for each monitoring region selected.

6. The object detection system according to claim 4, wherein
the second hardware processor is further configured to output, to the first hardware processor, the mode switching signal to switch to either the first mode or the second mode for each monitoring region corresponding to the region selection signal.

7. The object detection system according to claim 1, further comprising
a particular highly reflective sheet disposed at a rear end of the transport vehicle, the light receiving element receiving reflected light from the sheet at an intensity at or above the predetermined threshold, wherein
in the second mode, the first hardware processor receives only a signal corresponding to light, reflected from the highly reflective sheet, of a transport vehicle ahead and received by the light receiving element.

8. An object detection device for detecting an object based on reflected light for measurement light emitted to scan a space, the object detection device comprising:
a light emitting element;
a light receiving element;
a scanning optical system configured to scan a space by measurement light emitted from the light emitting element and guide reflected light from an object for the measurement light to the light receiving element; and
a hardware processor configured to:
(i) calculate a distance and a direction to the object based on physical relationship between the measurement light emitted from the light emitting element and the reflected light detected by the light receiving element;
(ii) store a monitoring region in a memory;
(iii) determine whether the distance and the direction to the object are within the monitoring region stored in the memory;
(iv) output an object detection signal when the hardware processor determines that the object is within the monitoring region; and
(v) switch to either a first mode or a second mode, the first mode being a mode in which the hardware processor performs (i), (iii), and (iv) regardless of an intensity of the reflected light received by the light receiving element, the second mode being a mode in which the hardware processor performs (i), (iii), and (iv) when the intensity of the reflected light received by the light receiving element is at or above a predetermined threshold and the hardware processor is inhibited from performing any of (i), (iii), (iv) when the intensity of the reflected light received by the light receiving element is below the predetermined threshold.

9. The object detection device according to claim 8, wherein
the hardware processor is further configured to:
store a plurality of monitoring regions,
select monitoring region from among the plurality of monitoring regions stored in the memory, and
be switchable to either the first mode or the second mode for each monitoring region selected.

10. The object detection device according to claim 9, wherein
either the first mode or the second mode is set for each of the plurality of monitoring regions stored in memory, and
the hardware processor is further configured to switch to either the first mode or the second mode set for the monitoring region selected.

11. The object detection device according to claim 9, wherein
the hardware processor receives the plurality of monitoring regions from an external controller in advance.

* * * * *